US009594851B1

(12) United States Patent
Chechik

(10) Patent No.: US 9,594,851 B1
(45) Date of Patent: Mar. 14, 2017

(54) DETERMINING QUERY SUGGESTIONS

(71) Applicant: Google Inc., Mountain View, CA (US)

(72) Inventor: Gal Chechik, Los Altos, CA (US)

(73) Assignee: GOOGLE INC., Mountain View, CA (US)

( * ) Notice: Subject to any disclaimer, the term of this patent is extended or adjusted under 35 U.S.C. 154(b) by 377 days.

(21) Appl. No.: 13/762,311

(22) Filed: Feb. 7, 2013

Related U.S. Application Data

(60) Provisional application No. 61/596,067, filed on Feb. 7, 2012.

(51) Int. Cl.
*G06F 7/00* (2006.01)
*G06F 17/30* (2006.01)

(52) U.S. Cl.
CPC .............................. *G06F 17/3097* (2013.01)

(58) Field of Classification Search
CPC ........................ G06F 17/3089; G06F 17/3069
USPC ........................................ 707/706, 737, 767
See application file for complete search history.

(56) References Cited

U.S. PATENT DOCUMENTS

| 8,032,507 | B1 * | 10/2011 | Bayardo et al. | ............... | 707/706 |
| 8,504,584 | B1 * | 8/2013 | Baker et al. | .................. | 707/768 |
| 2004/0230499 | A1 * | 11/2004 | Stack | ............................... | 705/26 |
| 2005/0149516 | A1 * | 7/2005 | Wolf et al. | .......................... | 707/3 |
| 2009/0187515 | A1 * | 7/2009 | Andrew | .............. | G06F 17/3064 706/12 |
| 2012/0166439 | A1 * | 6/2012 | Poblete et al. | ................. | 707/737 |

OTHER PUBLICATIONS

Mikhail Bilenko, Ryen W. WHite; Mining the Search Trails of Surfing Crowds: Identifying Relevant Websites From User Activity; 2008.*
Shalit, Uri et al, "Online Learning in the Manifold of Low-Rank Matrices," Journal of Machine Learning Research 13 (2012), 9 pages. Feb. 1, 2012.
Globerson, Amir et al, "Euclidean Embedding of Co-Occurrence Data," Journal of Machine Learning Research 8 (2007), pp. 2265-2295 Oct. 1, 2007.

* cited by examiner

*Primary Examiner* — James Trujillo
*Assistant Examiner* — John J Morris
(74) *Attorney, Agent, or Firm* — Middleton Reutlinger

(57) ABSTRACT

Methods and apparatus disclosed include identifying a pair comprising a document visited and a subsequent query, the subsequent query being submitted after visiting the document visited; generating a feature representation for the pair, each of the feature representations including one or more document features representing the content of a document visited, and one or more query features representing the content of a subsequent query; embedding the document features and the query features in a reduced dimensionality space; and determining a similarity measure for the reduced dimensionality space. In some embodiments, the similarity measure is indicative of the likelihood of co-occurrence of the document visited and the subsequent query. Other embodiments include iteratively training a query suggestion rule, applying the query suggestion rule to provide suggested queries in response to a document visited, corresponding systems, apparatus, and computer program products.

17 Claims, 6 Drawing Sheets

200

| Document locator, e.g., URL |

New Browser Features

There are many aspects to speed in the browser, and New Browser is designed to be fast and responsive in every possible way. To get a sense of New Browser's speed, watch these browser speed test videos:

<Embedded video>

| <Embedded video> |

New Browser launches from your desktop within seconds when you double-click the New Browser icon.

2. Fast to load web pages

New Browser is powered by the ExampleKit open source rendering engine, and loads web pages in a snap.

3. Fast to run web applications

Under the hood, New Browser is fitted with Bench1, a more powerful ExampleScript engine that we built to run complex web applications with lightning speed. With every new release, New Browser continues to improve in ExampleScript performance. You can test ExampleScript speed in the browser with the Bench1 and Bench2 benchmarks.

New Browser users will also enjoy fast, hardware-accelerated 3D graphics. To test this out in the latest version of New Browser, check out browserexperiments.com/ sampleg!

As web applications we use every day become more dynamic, browsers need to be able to construct and change elements on web pages as quickly as possible. This ability is measured by example DOM Core Tests. Just like ExampleScript performance, New Browser continues to improve DOM Core performance scores with every new release.

Curious about the technical details of what makes New Browser fast?

Read more about ExampleKit, Bench1 ExampleScript engine, and browser speed in the New Browser comic book. Watch technical videos on what makes New Browser fast, namely on DNS pre-resolution, Bench1 ExampleScript engine, and DOM bindings.

| Suggested queries. |
| --- |
| New Browser ExampleScript debugger |
| ExampleScript Bench1 benchmark |
| New Browser performance tweaks |
| ExampleKit rendering engine |

Fig. 2

DETERMINING QUERY SUGGESTIONS

CROSS REFERENCE TO RELATED APPLICATIONS

This application claims the benefit of U.S. Provisional Application No. 61/596,067 filed on Feb. 7, 2012, entitled "Determining Query Suggestions," the disclosure of which is incorporated by reference herein in its entirety.

BACKGROUND

The specification relates to information retrieval and in particular to determining query suggestions.

Search engines aim to identify resources (e.g., web pages, images, text documents, multimedia context) that are relevant to a user's needs and to present information about the resources in a manner that is most useful to the user. Search engines return search results in response to a user submitted query.

SUMMARY

The specification describes technologies relating to identifying query suggestions, e.g., based on a document visited.

In some implementations a method is provided that includes the steps of identifying a pair comprising a document visited and a subsequent query, the subsequent query being submitted after visiting the document visited; generating a feature representation for the pair, each of the feature representations including one or more document features representing the content of a document visited, and one or more query features representing the content of a subsequent query; embedding the document features and the query features in a reduced dimensionality space; and determining a similarity measure for the reduced dimensionality space. The similarity measure is indicative of the likelihood of co-occurrence of the document visited and the subsequent query.

These and additional embodiments may include one or more of the following features. A query suggestion rule may be trained. The training of the query suggestion rule may include iteratively embedding the document features and the query features in the reduced dimensionality space. The training of the query suggestion rule may be based on the embedding. The similarity measure may be based on the training of the query suggestion rule.

In some embodiments, the query suggestion rule may be trained iteratively by applying a relevancy scoring rule such as $S(w_i, q_i^+) > S(w_i, q_i^-) + c$, for every $(w_i, q_i^+)$, $(w_i, q_i^-)$ in P, where $S(w_i, q_i^+)$ is a similarity score for a more relevant pair, $S(w_i, q_i^-)$ is a similarity score for a less relevant pair in a group of pairs P, and c is a constant.

The feature representations may be sparse feature representations. The content of the subsequent query may comprise query terms. The document visited may be a web page. The content of the document visited may include words. Different vocabularies may be used for the content of the document visited and for the content of the subsequent query. Limited vocabularies may be selected for the document features and content features based at least in part on discriminating power of selected vocabularies. The selected vocabularies may include n-gram sequences of words, characters or terms. The method may further include determining the feature representations from the log of the past document visits and the past queries submitted to one or more search engines. The method may further include applying the query suggestion rule to the content of a first group of documents to score a first group of potential queries related to the documents in the first group of documents. The method may further include using at least the scores of the first group of potential queries to select query suggestions for the documents in the first group of documents and saving the query suggestions for future suggestion to users.

The reduced dimensionality space may represent co-occurrence of the document features and the query features by embedding the document features and the query features by embedding the document features and query features into a multi-dimensional space with fewer dimensions than used by the document features and the query features. The reduced dimensionality space may have two or more orders of magnitude fewer dimensions than used by the document features and query features.

Some embodiments of the optional aspects include corresponding systems, apparatus, and computer program products.

The method may further include receiving a document locator corresponding to an additional document visited; generating additional document features of the additional document visited, the additional document features represent the content of the additional document visited; mapping the additional document features in the reduced dimensionality space; locating one or more embedded query features based on their respective distances from the mapped additional document features, where the distance in the reduced dimensionality space is based on the similarity measure; and identifying potential suggested queries based on the located embedded query features. The method may further include selecting one or more of the potential suggested queries in response to the received document locator based on the similarity measure.

In some implementations a method is provided that includes the steps of: generating feature representations, each of the feature representations may include one or more document features representing the content of a document, and one or more query features representing the content of a subsequent query, the subsequent query being submitted after visiting the document visited; training a query suggestion rule, where the training of the query suggestion rule may include iteratively embedding the one or more document features and the one or more query features in a reduced dimensionality space; and determining a similarity measure for the reduced dimensionality space, wherein the similarity measure is indicative of the likelihood of co-occurrence of one or more of the documents visited and one or more of the subsequent queries.

The method may further comprise the steps of receiving a document locator corresponding to an additional document visited; generating additional document features of the additional document visited, the additional document features representing the content of the additional document visited; mapping the additional document features in the reduced dimensionality space by applying the query suggestion rule; locating one or more embedded query features based on their respective distances from the embedded additional document features, where the distance in the reduced dimensionality space is based on the similarity measure; and identifying potential suggested queries based on the located embedded query features. The method may further include selecting one or more of the potential suggested queries in response to the received document locator based on the similarity measure.

The method may further include applying the query suggestion rule to the content of a first group of documents to score a first group of potential queries related to the documents in the first group of documents, wherein at least some documents in the first group of documents are not represented in the feature representations.

Particular implementations of the technology disclosed can be implemented to realize one or more of the following advantages. A system can learn anticipated queries from a large collection of pairs of documents and user queries efficiently and with high accuracy. Experience with queries subsequent to visiting of documents can be generalized for documents with content similar to documents. Infrequent queries can be evaluated for use as suggested queries, even if they did not appear frequently enough in a training set to be used during training. Suggested queries can be identified and provided to users that reflect content that might not be directly suggested by the content of the document being selected, based on some users' past experiences.

Other implementations may include a non-transitory computer readable storage medium storing instructions executable by a processor to perform a method such as one or more of the methods described herein. Yet another implementation may include a system including memory and one or more processors operable to execute instructions, stored in the memory, to perform a method such as one or more of the methods described herein.

The details of one or more embodiments of the technology disclosed in this specification are set forth in the accompanying drawings and the description below. Additional features, aspects, and advantages of the technology disclosed will become apparent from the description, the drawings and the claims.

BRIEF DESCRIPTION OF THE DRAWINGS

FIG. 2 is a screenshot illustrating an example display of suggested queries related to content for a document visited or viewed.

DETAILED DESCRIPTION

Figure 1:
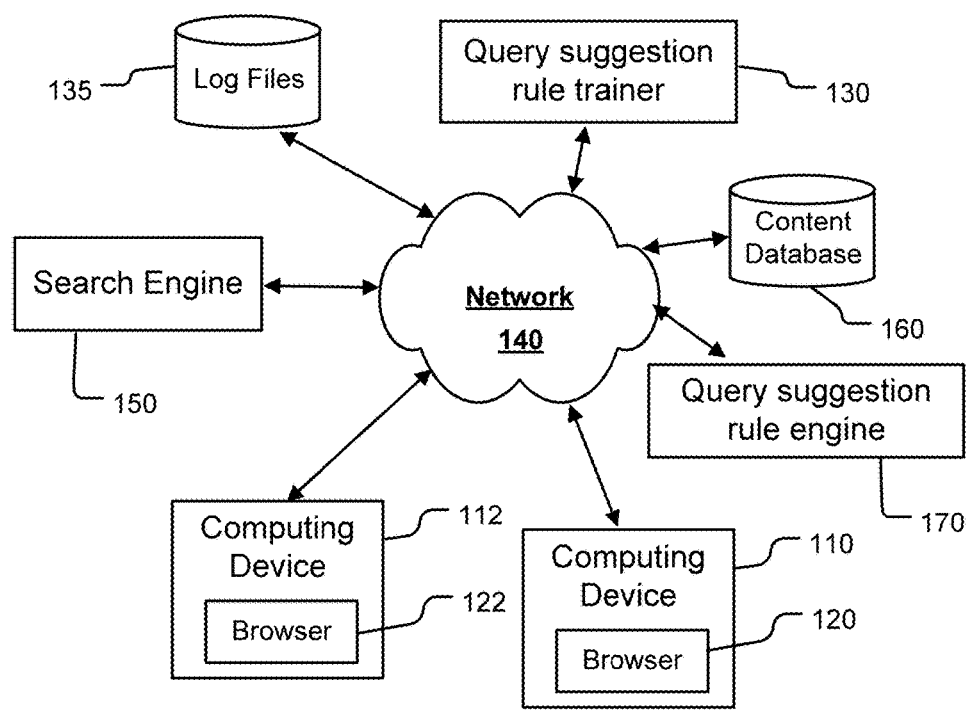
FIG. 1 illustrates a block diagram of an example environment in which generating query suggestions corresponding to documents visited can be used.

FIG. 1 illustrates a block diagram of an example environment 100 in which generating query suggestions corresponding to documents viewed can be used. The environment 100 includes computing devices 110, 112 and the search engine 150. The environment also includes a communication network 140 that allows for communication between various components of the environment 100.

During operation, users interact with the search engine 150 through the client computing devices 110, 112. The client computing devices 110, 112 and the search engine 150 each include memory for storage of data and software applications, a processor for accessing data and executing applications, and components that facilitate communication over the communication network 140. The computing devices 110, 112 execute applications, such as web browsers 120, 122, that allow users to formulate complete queries and submit them to the search engine 150. The search engine receives queries from the computing devices 110, 112, and executes the queries against a content database 160 of available documents such as web pages, images, text documents and multimedia content. The search engine 150 identifies content that matches the queries, and responds by generating search results that are transmitted to the computing devices 110, 112 in a form that can be presented to the users. For example, in response to a query from the computing device 110, the search engine 150 may transmit a search results web page to be displayed in the web browser 120 executing on the computing device 110.

Log files 135 include data regarding documents viewed and subsequent searches that reflect user experience viewing documents and formulating subsequent searches. The data in these log files 135 may be anonymized. The log files 135 may further include time stamp data and session identification data that facilitate grouping of documents viewed and subsequent queries within time windows or by user session. The log files 135 may be collectively stored on one or more computers and/or storage devices.

The environment 100 includes a query suggestion rule trainer 130 used to train a query suggestion rule. During training of the query suggestion rule, one or more vocabularies for documents and queries are mapped into a reduced dimensionality space that represents co-occurrence of content features of documents and of token, term or word features of potential queries. Content features of documents represent the content of documents, e.g., words or n-gram sequences of words, terms, numbers, codes that mix numbers and letters, misspellings, typos, characters and other tokens. Similarly, token, term or word features of queries or potential queries include words or n-gram sequences of words, terms, numbers, codes that mix numbers and letters, misspellings, typos, characters and other tokens. The query suggestion rule trainer 130 can be implemented in hardware, firmware, or software running on hardware. The query suggestion rule trainer 130 is described in more detail below with reference to FIGS. 3-5.

The applications 120, 122 executing on the client computing devices 110, 112 also can provide document locators that identify a document being viewed. The applications may be for example a web browser, a toolbar running in a web browser, or a search client running on the client computing devices 110, 112.

In response to a report of a document locator that identifies a document being viewed, a search engine 150 or an application 120, 122 without mediation of a search engine forwards the document locator to the query suggestion rule engine 170, which can be implemented in hardware or software, which can include firmware or microcode, running on hardware. The query suggestion rule engine 170 may use results of the query suggestion rule trainer to pre-compute or to determine from content of the document identified by the document locator one or more queries. The query suggestion rule engine 170 sends out one or more suggested queries that are relevant to the content of the document being viewed, in response to the document locator that it received.

The query suggestion rule engine 170 suggests queries that the users may want to submit to follow up on the content of the document viewed. For example, one user is viewing a web page of a business that sells slacks. Additional users who have viewed documents with similar content have formulated queries for accessories, such as belts. Even though the term belt does not appear in the document being viewed, it appears in logs that match viewing the document to content to subsequent queries. Using results from the query suggestion rule trainer 130, the query suggestion rule engine 170 can formulate a suggestion for a user to search for sites that sell belts or a particular kind of belt. As another example, a web page may include a picture of two celebrities, one of whom is unknown to the user viewing the document. Even though the second person's name does not appear in the document, it appears in logs that match viewing the document to content to subsequent queries. Using results from the query suggestion rule trainer 130, the query suggestion rule engine 170 can formulate a suggestion to search for information about the second person by name.

The query suggestion rule engine 170 may respond, for example, to viewing of a document with competitive or pricing oriented queries. Consider a user viewing a web page for audiophile class DVD players, who is not familiar with new entrants into this market segment. The query suggestion rule engine 170 may provide suggested queries based on content of the document being viewed. The suggested queries may provide search for web sites of other high-end DVD system manufacturers and for reviews of similarly priced equipment. As another example, a visitor to an amusement park web site might receive a suggested query for discount coupons or advance purchase deals. Similarly, a visitor to an admissions web site for a private school in their home town might receive suggested queries for other private school web sites or for review articles about private schools in their home town.

In general, the query suggestion rule engine 170 may respond to the content of a document viewed, based on a reported document locator, by providing suggested queries that take advantage of queries formulated by prior users who were viewing the same or similar content. The suggested queries are not limited by words found in the document being visited. While the query suggestion rule trainer 130 and the query suggestion rule engine 170 are illustrated as separate components, they can be integrated into one component. Individually or collectively, they can be combined with other components. In addition, the components in FIG. 1 can be combined or separated into additional components.

The computing device 110, 112 receives the query suggestions via the network 140 and displays them in the application 120, 122, such as a browser. The user can select a suggested query and the application 120, 122 will invoke the search engine 150 to run the selected query against the content database 160.

The network 140 facilitates communication between the various components in the environment 100. In one implementation, the network 140 includes the Internet. The network 140 can also utilize dedicated or private communication links that are not necessarily part of the Internet. In one implementation, the network 140 uses standard communications technologies, protocols, and/or inter-process communication techniques.

Many configurations are possible having more or less components than the environment 100 shown in FIG. 1. For example, the environment 100 can include multiple search engines. The environment 100 can also include many more computing devices that submit queries or that are used to visit or view documents.

FIG. 2 is an example screenshot illustrating display of suggested queries related to content for a document viewed. The content is displayed in a first window 210. The suggested queries are displayed in a second window 240 that may be contained within the application window 210 or positioned separately, outside the application window 210. Optionally, the application window 210 includes one or more text entry controls or information bars 220 that display a document locator, such as a URL or file name, display a document title, and/or allow entry of search terms. In some applications, one text entry control serves multiple rules. In some applications, separate areas and displays or controls are allocated to separate rules. The application window 210 displays content 230 of a document being viewed. This application or a separate application or separate window may be used to invoke a search engine 150.

This example document 230 describes features of a "New Browser." The document may include embedded links, indicated by underlining in the figure. Suggested queries appear in a box 240. These suggestions can be positioned elsewhere on the display, such as in a side panel or in a control 220 that is used for search entry. The suggested queries could appear as the user views the content or could appear when the user operates the application in a way that suggests preparation to enter a search. For instance, the suggested queries could become visible when the user's pointing device moves over or near the control 220. In some implementations, upon navigation from the document to a search page, the search page could open with suggested queries visible. Or, if the user goes to a search page that uses auto-complete to suggest queries, the search box could be populated with suggested auto-completions of a query even before the user begins typing.

A user of the application 120, 122 can select one of the suggested queries. A conventional selection device can be used, such as a mouse, keystroke sequence or voice command. The application that controls 210 may respond to the selection of a suggested query or a separate application that controls the suggested query window 240 may respond to the selection. A selected query is submitted via network 140 to a search engine 150.

The suggested queries in this example are for illustration only and not based on analysis of logs. Some queries suggested in the second window 240 include tokens or search terms that do not appear in the content 230 of first window 210. For instance, the words "debugger", "benchmark" and "tweaks" are not in the content 230. This illustrates the possibility that a query suggestion rule engine 170 that works from document content and prior user follow-up on document can suggest query terms and even tangential queries that are not evident on the face of the document.

Figure 3:
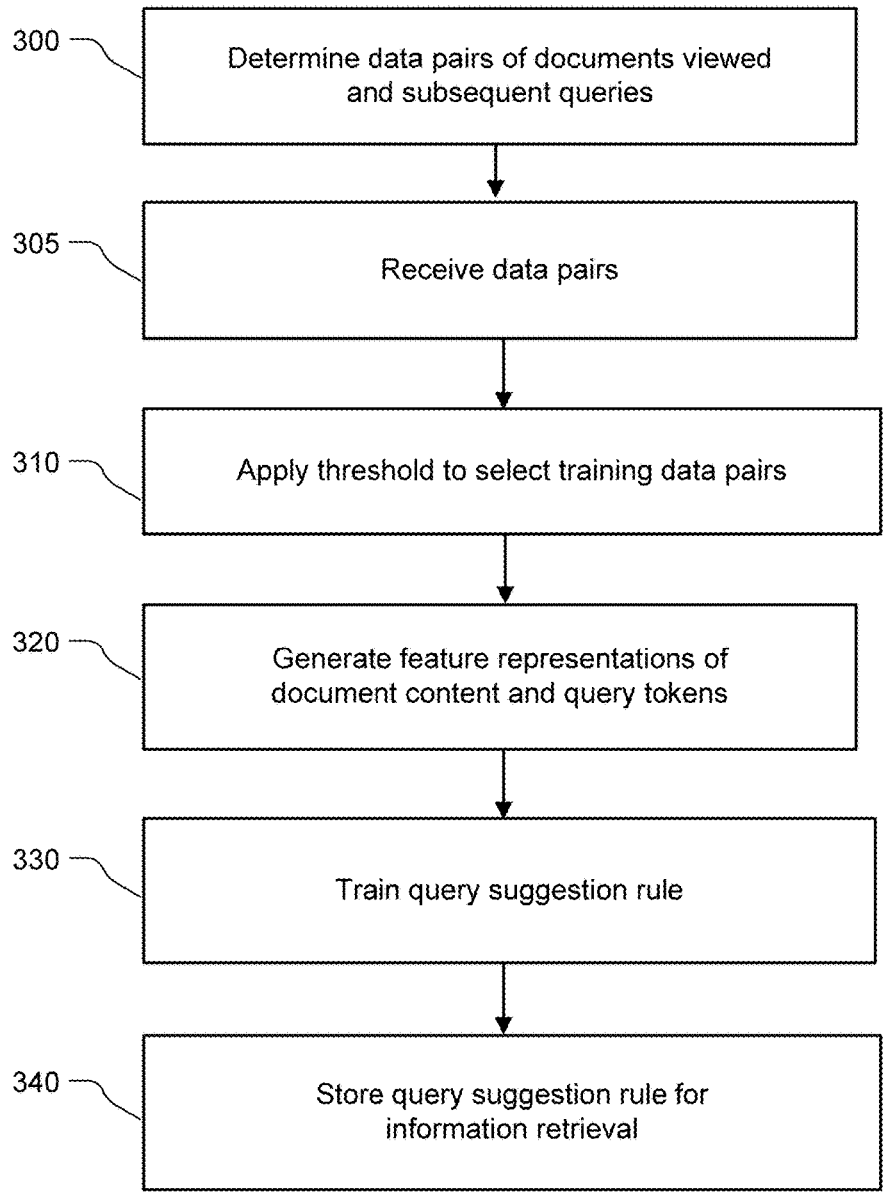
FIG. 3 is a flow chart illustrating an example process for training a query suggestion rule.

FIG. 3 is a flow chart illustrating an example process for training a query suggestion rule. For convenience, the method 300-340 will be described with respect to a system that performs at least parts of the method.

In some implementations, the system determines pairs of documents visited and subsequent queries 300. In some implementations, the pairs of documents are determined from at least one log file 135 of past document visits and queries subsequently submitted to one or more search engines 150. For positive training examples, data pairs include a document visited and a subsequent query. To illustrate how a system may determine data pairs, consider a log file that includes entries for when a document is first visited, when a search is submitted, when a search result page is visited, when a result is selected, when a result document is visited, etc. A data pair may be represented as a log entry that identifies a document visited followed by a log entry that identifies a search submission, with the search submission relevant to content of the document visited. This data pair presents a positive example for training. A second log sequence involves a log entry that identifies a document visited followed by a log entry that identifies a search submission, with the search submission unrelated to content of the document visited, such as a social network search. While this is a data pair, it is a negative example for training. This data pair can be marked as a negative example (or disqualified from use in training) based on search terms that identify a query that is not relevant to the content of the document visited. In some implementations, it can be marked as a negative example (or disqualified from use in training) based on lack of any semantic relevance of any term in the query to the content of the document visited. In some implementations, human judgment could be applied to label or qualify a data pair flagged by the system as questionable. A third log sequence involves a second, third or later search submission entry after a log entry for a document visited. The second and third search submissions can be paired with the document visited as second and third data pairs. Pairing of second and third search submission may be filtered to reduce noise. The signals of unlikely search relevance identified above, including terms recognized to lead away from the document content and lack of semantically relevant terms, can be applied to filter out second, third and later search submissions. In some implementations, passage of time can be applied as a filter. A time limit could be applied, such as one, five, or ten minutes from the first search to another subsequent search, to disqualify the late search from being paired with the document visited. An intervening event, such as another document being visited without returning to the original document could eliminate a search from pairing. Similarly, expiration or termination of a session could end the pairing of the document visited with subsequent searches.

The system receives data pairs 305 of documents visited and subsequent queries. In some situations, these document pairs can originate in at least one log 135 of past document views and past queries submitted to one or more search engines. The document pairs may be received by standard or other communications technologies, protocols, and/or interprocess communication techniques. The data pairs optionally may be labeled as positive or negative examples. In some implementations, so-called hard negative examples are available for training. Hard negative examples that are reliably distinct from positive examples can yield performance improvement. One way to produce hard negative examples is to have a person review machine generated negative examples and confirm that they are distinctly negative examples. Another way is to have a person pair documents with queries that the person considers to be negative examples of queries that would be of interest to someone who has visited a particular example.

The data pairs may be subject to filtering. Optionally, the system applies a threshold to select training data pairs 310. In some implementations, only data pairs of documents visited and subsequent queries that appear multiple times in the log files 135 are accepted for training. The threshold may be in a range of two to fifty instances. In some implementations, subsequent queries entered more often for a document than a threshold might be used. For example, for a particular document, only subsequent queries that appeared in at least two to thirty percent of the subsequent queries for that particular document might be accepted for training. An appropriate threshold can be empirically determined from examination of the log data. When a threshold is applied to select training data pairs, those data pairs that appear only once are not used for training. Similarly, if a threshold higher than one is applied, the data pairs that fail to meet the threshold are not used for training.

The system generates feature representations of document content of the document visited and query tokens 320, both of which are potentially drawn from large vocabularies. In some implementations, the feature representations include one or more document features representing the content of a document visited, and one or more query features representing the content of a subsequent query; embedding the document features and the query features in a reduced dimensionality space; and determining a similarity measure for the reduced dimensionality space. The similarity measure is indicative of the likelihood of co-occurrence of the document visited and the subsequent query. The one or more document features representing the content of a document visited, and the one or more query features representing the content of a subsequent query are both vectors.

In some implementations, the feature representations are sparse feature representations. The sparse feature representations may conserve memory. The query tokens or terms presented include words or n-gram sequences of words, terms, numbers, codes that mix numbers and letters, misspellings, typos, characters and other tokens. For example, n-grams can be a sequence longer than 1. Some query terms are used infrequently. Others, sometimes called stop words, are used so frequently that they have no discriminatory power to help decide whether a document is responsive or unresponsive to a search. A large vocabulary can be represented by a term vector. The term vector can be binary, recording the presence of a term, count-oriented, recording the frequency of terms, or weighted, reflecting the frequency of terms and their discriminatory power. One weighting scheme gives greatest importance to terms that are relatively frequent in a document or group of documents and relatively infrequent in a larger population of documents. This scheme is referred to as term frequency/inverse domain frequency (TFIDF). Applying this weighting scheme, the frequency of a term in a document or group of documents is divided by a factor that reflects the frequency of the same term in a larger domain or population of documents.

Figure 4:
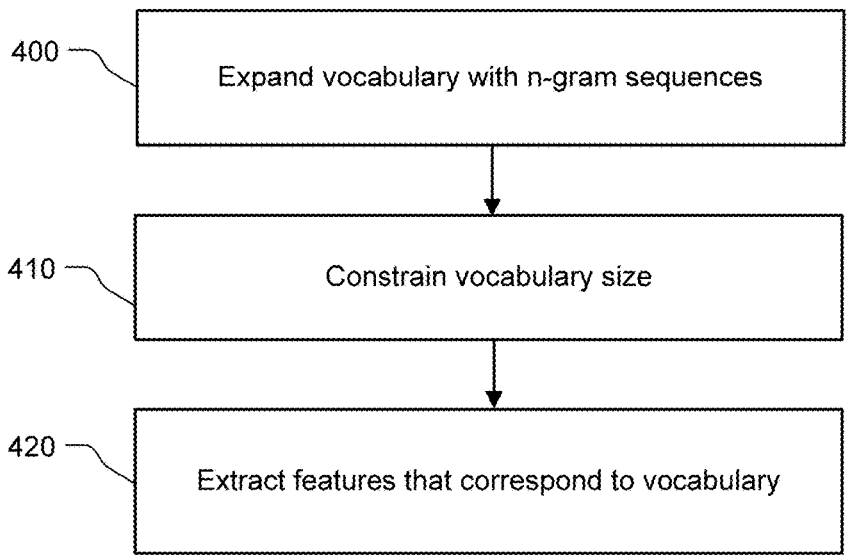
FIG. 4 is a flow chart illustrating an example process for establishing a vocabulary and extracting features that correspond to the vocabulary.

Turning to the next figure, FIG. 4 is a flow chart illustrating an example process for establishing a vocabulary and extracting features that correspond to the vocabulary. For convenience, the method 400-420 will be described with respect to a system that performs at least parts of the method. The system expands and constrains the vocabulary. It expands the vocabulary with n-gram sequences of words, terms or tokens 400. This expanded vocabulary represents word combinations such as 'Los Angeles' a separate feature, distinct from the individual features for 'los' and for 'angeles'. A large vocabulary space can be reduced by applying one or more criteria, such as stop word elimination, discriminative power of terms, information gain and Chi-square scores. The system constrains the vocabulary size 410 by applying various rules. This may be a separate action or it may be integrated with expanding the vocabulary.

Different vocabularies of reduced size may be developed for documents and search tokens, as the grammars of documents and queries are much different. As computing power and memory availability increases, the size of a vocabulary can increase.

With a reduced size vocabulary, the system extracts features that correspond to the vocabulary 420. A document can be represented as a term vector using a conventional bag of words approach, in a vector that may include words or n-gram sequences of words, terms, characters or other selected tokens. Again, the term vector can be binary, feature counts or weighted feature counts. A query can be represented by a similar feature vector, optionally using a different feature set. Referring back to FIG. 3, the system generates feature representations of the document content and the query terms in the data pairs. In some implementations, the feature representations are sparse, in the sense that a document of 10,000 words may have only 1,000 terms in the applicable vocabulary, which is a small proportion of a vocabulary. A query also may be sparse, given how few terms typically appear in a query.

The system trains a query suggestion rule 330, using the feature representations of the data pairs, e.g., sparse feature representations. It trains the rule and embeds the sparse feature vectors in a reduced dimensionality space. Linear combinations of features in the sparse feature representations are mapped into the reduced dimensionality space. The rank or dimensionality of the embedded space can be determined empirically by trying a range of space sizes and measuring the quality of each rank using, for example, human evaluation. The quality of each rank may, optionally, be constrained by available computer memory, so that a higher rank requires a smaller vocabulary.

Such embeddings of objects in a low-dimensional space maybe used in the context of unsupervised or minimally supervised learning models. They provide easily interpretable representations of relationships among objects. Joint embeddings may be used when analyzing heterogeneous objects that may be associated through shared attributes. The goal of a joint embedding is to find a geometry that reflects the statistical relationship between the objects. The joint relationships or shared attributes are typically representable in a reduced dimensionality space using a distance or similarity measure. For instance, words and images, though syntactically different, may still be associated through their shared semantic attributes. Joint embedding of words and images induces a distance measure between images that captures their semantic similarity. Joint embedding of heterogeneous objects, based on object co-occurrence statistics, is one way to obtain a good distance or similarity measure.

Training and embedding can proceed together. Weakly supervised training using a so-called online learning technique has been combined with projection onto a manifold of reduced dimensionality.

When learning models are represented in matrix forms, enforcing a low-rank constraint can improve the memory and run time complexity, while providing a natural regularization of the model. However, naive approaches to minimizing functions over the set of low-rank matrices may be time consuming (repeated singular value decomposition of the matrix) or numerically unstable (optimizing a factored representation of the low-rank matrix). In some implementations, optimization over manifolds and an iterative online learning procedure, consisting of a gradient step, followed by a second-order retraction back to the manifold can be used to produce reduced dimensionality. While the retraction may be costly to compute, and so is the projection operator that approximates it, another retraction can be computed efficiently. That retraction has run time and memory complexity of $O((n+m)k)$ for a rank-k matrix of dimension m×n, when using an online procedure with rank-one gradients. The retraction can be used in an online learning technique Loreta to learn a matrix-form similarity measure over pairs of documents represented as high dimensional vectors. Loreta may improve the mean average precision over a passive-aggressive approach in a factorized model, and may improve over a full model trained on pre-selected features, e.g., using the same memory requirements. Loreta can be adapted to learn positive semi-definite low-rank matrices, providing an online technique for low-rank metric learning.

Retractions can capture the notion of going along a shortest path (geodesic curve) on the manifold. For the low-rank manifold considered here calculating the geodesic curve can be computationally expensive. The geodesic path can be approximated to a second order by a set of operators called retractions. Given a point W in an embedded manifold M, a second order retraction is any function $R_W: T_W M \to M$ which satisfies the following three conditions:

1. Centering: $R_W(0) = W$.
2. Local rigidity: The curve $\gamma_\xi: (-\epsilon, \epsilon) \to M$ defined by $\gamma_\xi(\tau) = R_W(\tau \xi)$ satisfies $\gamma^{\cdot}_\xi(0) = \xi$, where $\gamma^{\cdot}$ is the derivative of $\gamma$ by $\tau$.
3.

$$P_W\left(\frac{dR_W(\tau\xi)}{d\tau^2}\bigg|_{\tau=0}\right) = 0,$$

for all $\xi \in T_W M$, where $P_W$ is the linear projection from the ambient space onto the tangent space $T_W M$. When viewed intrinsically, the curve $R_W(\tau \xi)$ defined by a second order retraction has zero acceleration at point W, namely, its second order derivatives are all normal to the manifold. One example of a second-order retraction onto embedded manifolds is the projection operation, which maps a point X to the point $Y \in M$ which is closest to it in the Frobenius norm. Such projections are viewed here as one type of a second order approximation to the exponential mapping, which can be replaced by other second-order retractions, e.g., when computing the projection is too costly.

Given the tangent space and a retraction, we now define a Riemannian gradient descent procedure for the loss $\mathcal{L}$ at point $W^t \in M$ that can include three steps: First, obtain the Euclidean gradient $\tilde{\nabla}\tilde{\nabla}\mathcal{L}(W^t)$ in the ambient space. Second, linearly project the ambient gradient onto the tangent space $T_W M$, and compute $\xi^t = P_{W^t}(\tilde{\nabla}\tilde{\nabla}\mathcal{L}(W^t))$. Third, retract the Riemannian gradient $\xi^t$ back to the manifold $W^{t+1} = R_{W^t}(\xi t)$.

With a proper choice of step size, this procedure can be proved to have local convergence for a retraction.

Specifically, the technique Loreta learns a low rank matrix online by performing stochastic gradient descent on the manifold of low-rank matrices with a gradient rank of r=1. The retraction can be calculated as the product of two low rank factors: the first is an n×k matrix, the second a k×m matrix. Given a gradient $\tilde{\nabla}\mathcal{L}(W^t)$ of the loss in Input: Matrices $A \in \mathbb{R}^{n \times k}$, $B \in \mathbb{R}^{m \times k}$ s.t. $W = AB^T$.
Matrices $G_1 \in \mathbb{R}^{n \times r}$, $G_2 \in \mathbb{R}^{m \times r}$ s.t. $G_1 G_2^T = -\eta \tilde{\nabla} L(W) \in \mathbb{R}^{n \times m}$,
where $\tilde{\nabla}L(W)$ is the gradient in the ambient space and $\eta > 0$ is the step size.
Output: Matrices $Z_1 \in \mathbb{R}^{n \times k}$, $Z_2 \in \mathbb{R}^{m \times k}$ such that $Z_1 Z_2^T = R_W(-\eta \tilde{\nabla} L(W))$.

| Compute: | matrix dimension | runtime complexity |
|---|---|---|
| $A^\dagger = (A^T A)^{-1} A^T$, $B^\dagger = (B^T B)^{-1} B^T$ | k × n, k × m | $O((n+m)k^2)$ |
| $a_1 = A^\dagger \cdot G_1$, $b_1 = B^\dagger \cdot G_2$ | k × r, k × r | $O((n+m)kr)$ |
| $a_2 = A \cdot a_1$ | n × r | $O(nkr)$ |
| $Q = b_1^T \cdot a_1$ | r × r | $O(kr^2)$ |
| $a_3 = -\frac{1}{2}a_2 + \frac{3}{8}a_2 \cdot Q + G_1 - \frac{1}{2}G_1 \cdot Q$ | n × r | $O(nr^2)$ |
| $Z_1 = A + a_3 \cdot b_1^T$ | n × k | $O(nkr)$ |
| $b_2 = (G_2^T B) \cdot B^\dagger$ | r × m | $O(mkr)$ |
| $b_3 = -\frac{1}{2}b_2 + \frac{3}{8}Q \cdot b_2 + G_2^T - \frac{1}{2}Q \cdot G_2^T$ | r × m | $O(mr^2)$ |
| $Z_2^T = B^T + a_1 \cdot b_3$ | k × m | $O(mkr)$ | the ambient space, it calculates matrices M, $N_1$ and $N_2$ which allows one to represent the projection onto the tangent space, and to calculate the retraction using a Riemannian stochastic gradient descent technique. Where the gradient matrix is of rank-r and is available in a factorized form $Z=G_1 G_2^T$, with $G_1 \in \mathbb{R}^{n \times r}$, $G_2 \in \mathbb{R}^{m \times r}$, the technique can keep in memory relatively small matrices.

In some implementations, a gradient matrix with a rank of one can be used for a gradient step update. To speed up calculations, one can use the fact that for r=1 the outputs $Z_1$ and $Z_2$ become rank-one updates of the input matrices A and B. This allows reuse of the pseudo-inverses $A^\dagger$ and $B^\dagger$ from the previous round, and to perform a rank-one update to them, e.g., following an incremental technique for calculating a pseudo-inverse matrix, e.g., a Moore-Penrose pseudo-inverse matrix.

An online learning procedure can be used to train the model. At each round, three instances are sampled: a query document $q \in \mathbb{R}^n$, and two documents $p_+, p_- \in \mathbb{R}^n$ such that $p_+$ is known to be more similar to q than $p_-$. To have the model assign a higher similarity score to the pair $(q, p_+)$ than the pair $(q, p_-)$, Loreta uses the online ranking hinge loss defined as $l_W(q, p_+, p_-) = [1 - S_W(q, p_+) + S_W(q, p_-)]_+$, where $[z]_+ = \max(z, 0)$.

Some approaches that might be applied include naïve PSD gradient descent, iterative passive-aggressive online techniques, and projected gradients. These approaches can be combined with clever sampling schemes that instead of drawing samples randomly, selected samples based on their similarity scores of classes. Such approaches include $W_{SABIE}$, which draws samples in a way that is designed to minimize loss, using $W_{ARP}$.

Either weakly or strongly supervised training can be applied. In some implementations, training relies on inferred positive and negative training example pairs. In some implementations, the positive and negative training examples are selected by filtering a larger group of potential training examples or by applying human expertise to label the examples.

One way to produce weakly supervised examples is to automatically select the positive and negative training examples. As explained above, in some implementations, only data pairs of documents visited and subsequent queries that appear multiple times in the log files 135 are accepted for training. The threshold may be two, five or ten instances in the log, for example. In some implementations, an appropriate threshold can be empirically determined from inspection or analysis of log data. A threshold of multiple instances of data pairs may optionally be combined with filtering to eliminate frequent searches that are presumptively unrelated to document content. This threshold can be used to automatically select positive training examples. Negative training examples can be identified by using query terms that do not appear in any data pair for a particular document.

For a training iteration, the positive and negative example can be identified as $(w_i, q_i^+), (w_i, q_i^-)$ where $(w_i, q_i^+), (w_i, q_i^-) \in P$. The notation $(w_i, q_i^+)$ pairs the content of the document visited in the data pair with a subsequent query relevant to content. The notation $(w_i, q_i^-)$ pairs the same document content with a less relevant query. Both the more and less relevant data pairs belong to a group of data pairs P.

In some implementations, relevance feedback information $r(w_i, q_i^+, q_i^-)$ is provided as real numbers (e.g., with more information than "within a relevant set" or "not within a relevant set.") The system can use these number values to bias training toward those pairs that have a higher relevance feedback value. For example, if the similarity between two subsequent queries is measured as a fraction of those queries that co-occur for one document or another, a real number relevance value can be obtained. Similarly, human evaluation can be used to evaluate the relevance of various queries to content of a particular document.

Iterative training with twosomes of more and less relevant data pairs involves, in some implementations, iteratively refining one or more matrices to enforce a similarity inequality, such as $S(w_i, q_i^+) > S(w_i, q_i^-) + c$, for every $(w_i, q_i^+), (w_i, q_i^-)$ in P, where $S(w_i, q_i^+)$ is a similarity score for a more relevant pair, $S(w_i, q_i^-)$ is a similarity score for a less relevant pair in a group of pairs P, and c is a constant. The similarity score depends on a combination of a so-called query suggestion rule and the embedding the one or more document features representing the content of a document visited, and one or more query features representing the content of a subsequent query in a reduced dimensionality space.

Applying the LORETA approach, a so-called retraction operator is represented as the product of two low-rank factors: the first is an n×k matrix called A and the second is a m×k matrix called B, where k is the rank of the reduced dimensionality space, and additional factors are the dimensionality of the document features of the document visited and the content features of the subsequent query. These feature representations may be sparse feature representations. Conceptually, separate roles can be understood for these matrices. The first matrix projects the feature vectors into the reduced dimensionality, k-dimensional space. The second matrix tunes the similarity rule in the k-dimensional space. The elements of these two matrices A and B are iteratively adjusted as the system trains the query suggestion rule 330 and embeds the document features and the query features in a reduced dimensionality space. Once these two matrices have been trained, an inner product in k-dimensional real space between the projected vectors Aw and Bq may be obtained as $S(Aw, Bq) = w^T A B^T q$, and a similarity measure for the reduced dimensionality space may be obtained as the natural distance in the k-dimensional real space between the mapped document features and the mapped query features. A similarity score $S(w, q)$ for a document visited and a subsequent query may also be calculated based on the similarity measure. In some implementations, this similarity score may be iteratively used to train the query suggestion rule until some predetermined threshold is satisfied.

Figure 5:
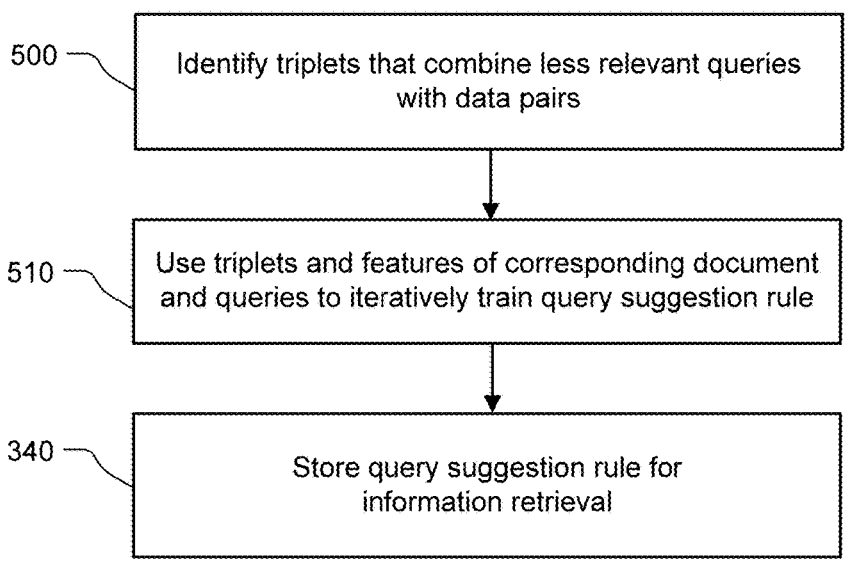
FIG. 5 is a flow chart illustrating an example process for identifying and using triplets to iteratively train the query suggestion rule.

FIG. 5 is a flow chart illustrating an example process for identifying and using triplets to iteratively train the query suggestion rule. For convenience, the method 500-510, 340 will be described with respect to a system that performs at least parts of the method. In the implementation illustrated, the system identifies triplets $(w_i, q_i^+, q_i^-)$ that combine less relevant queries with data pairs of a document and a more relevant query 500. In some implementations, the system identifies twosomes of data pairs: the document and more relevant query $(w_i, q_i^+)$ and the document and the less relevant query $(w_i, q_i^-)$. The system uses the triplets and features to iteratively train the query suggestion rule 510. In particular, it iteratively considers features of the document and of the more and less relevant queries in a multitude of triplets to train the query suggestion rule and to embed the feature representations in a reduced dimensionality space. The system then stores the query suggestion rule 340, as illustrated in both FIGS. 3 and 5. This query suggestion rule is available for information retrieval, such as when queries are suggested as a document is being visited.

Figure 6:
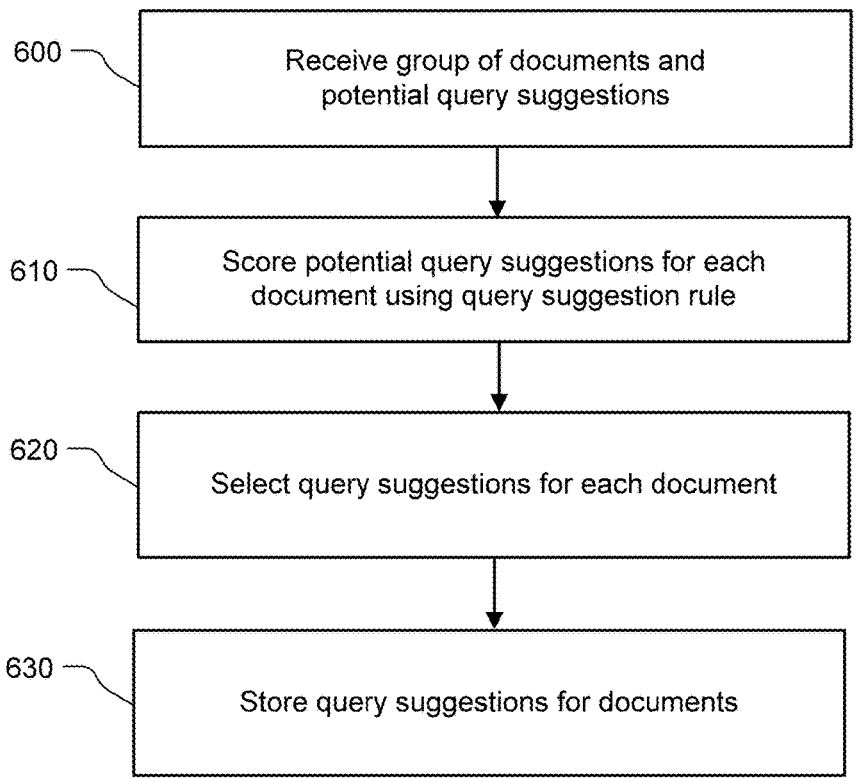
FIG. 6 is a flow chart illustrating an example process for selecting query suggestions using the query suggestion rule.

FIG. 6 is a flow chart illustrating an example process for selecting query suggestions using the query suggestion rule. For convenience, the method 600-630 will be described with respect to a system that performs at least parts of the method. In this context, the query suggestion rule can be used to score potential query suggestions. The system receives a group of documents and potential query suggestions 600. The potential query suggestions may relate to individual documents or to the group of documents. The system scores the potential query suggestions for each document using the query suggestion rule 610. The trained query suggestion rule serves as a scoring rule. It can be used to score individual documents against potential query suggestions using their respective feature representations. Similarity scores can be generated using the query suggestion rule without necessarily pre-filtering potential query suggestions. The scoring rule naturally distinguishes between highly relevant and irrelevant query suggestions. The system selects query suggestions for each document 620. It uses the scores to select the query suggestions. In some implementations, it uses a cut-off threshold applied to the scores, such that only those query suggestions with a score exceeding the cut-off threshold are eligible to be stored. This cut-off threshold may be empirically determined. The system stores query suggestions for the documents 630. It may store a limited number of query suggestions, if a predetermined limit is imposed. Or, in some implementations, it may store all of the query suggestions that satisfy the cut-off threshold.

Figure 7:
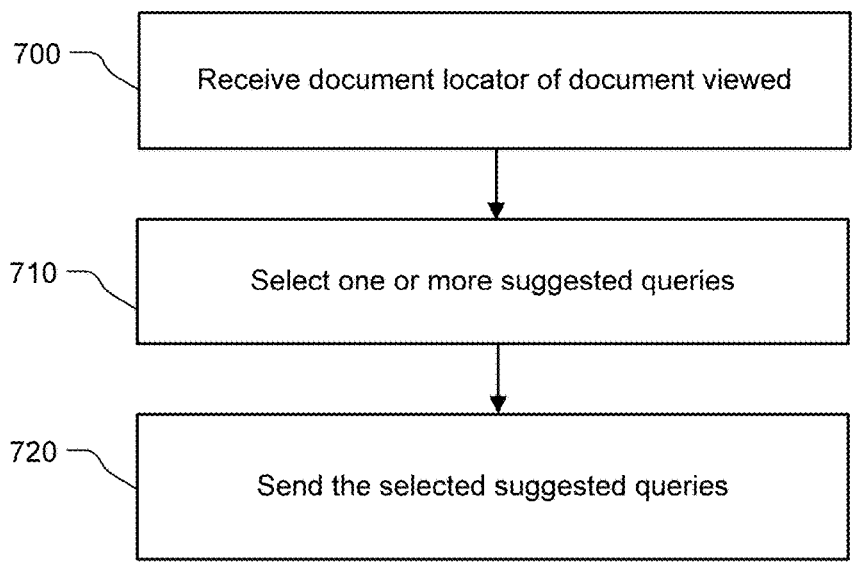
FIG. 7 is a flow chart illustrating an example process for providing suggested queries based on a document viewed.

FIG. 7 is a flow chart illustrating an example process for providing suggested queries based on a document visited. For convenience, the method 700-720 will be described with respect to a system that performs at least parts of the method. In one implementation, the system responds to a document locator by selecting one or more suggested queries based at least in part on scoring of content of the document visited against previously logged subsequent queries related to the same or similar content as the content of the document visited using a trained query suggestion rule. For example, a user may be working at a computing device 110, 112 using a browser 120, 122 and viewing a document. The system may receive a document locator of the document visited 700. The system selects one or more suggested queries 710, based on content of the document being visited. The system recognizes the document locator and retrieves query suggestions previously stored.

In some implementations, the system may use the trained query suggestion rule to screen potential queries after receiving the document locator. In these implementations, the system retrieves document content corresponding to the document locator. It assembles a set of potential query suggestions and extracts feature representations of both the document content and the potential query suggestions. One way to assemble a set of potential query suggestions is to search for one or two terms that match the document best. This can be done enumerating possible query terms from the document, applying the query suggestion rule to score them, and using a predetermined number of the top query terms as suggested queries. In some implementations, this can be done by looking at the queries that users have entered while visiting a page. Query phrases of two, three, four or more terms enumerated from the top scoring query terms can also be scored to determine whether they might be better suggestions than high scoring individual terms. Suggested queries formulated in this manner can be forwarded to a further process that evaluates queries suggestions compiled using various approaches.

In some implementations, the system could accept query suggestions formulated using various approaches and use the query suggestion rule to score the query suggestions. The scores could be used to select a predetermined number of the top scoring query suggestions. In some implementations, the scores could be forwarded to a further process that evaluates queries suggestions compiled using various approaches.

Optionally, the technology described can be applied to limited domains that do not require semantic understanding of natural language, such as domains that contain a small number of technical terms. For example, posters in software forums often use specific technical terms that link their interests.

The system applies the query suggestion rule to score the potential query suggestions against the document. It selects one or more of these potential queries using the scores, as described above. Common to these implementations, the system sends the selected suggested queries 720 in response to the received document locator. For instance, the system may send suggested queries to a computing device 110, 112. The computing device may forward the suggested queries to a browser 120, 122, which may produce a display such as the one illustrated by the screenshot in FIG. 2

Figure 8:
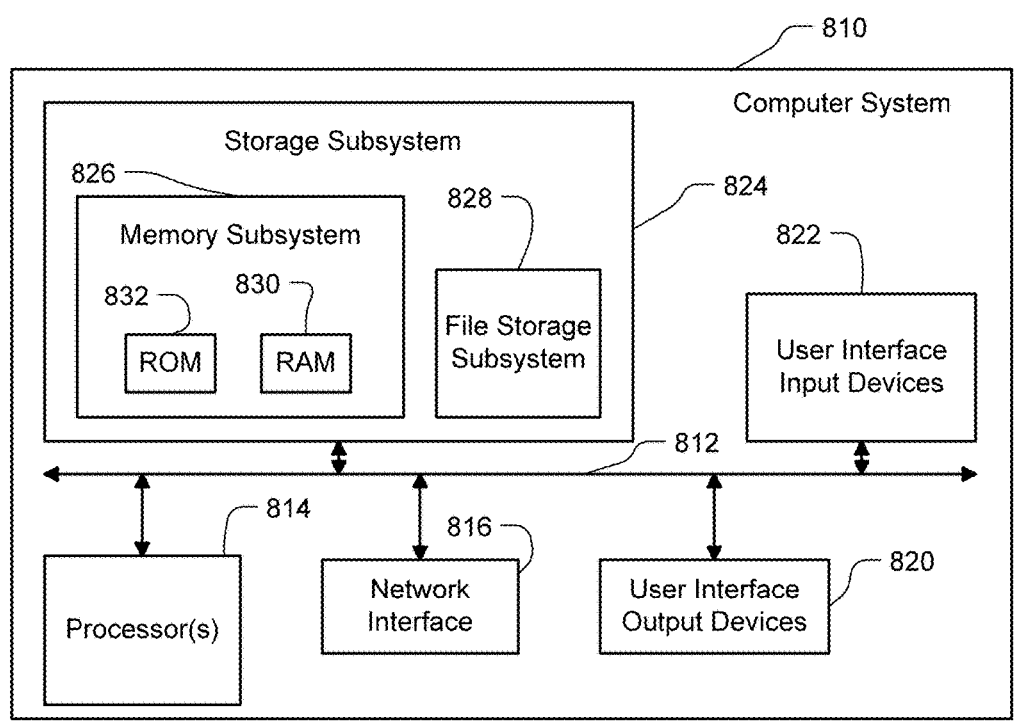
FIG. 8 is a block diagram of an example computer system.

FIG. 8 is a block diagram of an example computer system. Computer system 810 typically includes at least one processor 814, which communicates with a number of peripheral devices via bus subsystem 812. These peripheral devices may include a storage subsystem 824, comprising for example a memory subsystem 826 and a file storage subsystem 828, user interface input devices 822, user interface output devices 820, and a network interface subsystem 816. The input and output devices allow user interaction with computer system 810. Network interface subsystem 816 provides an interface to outside networks, including an interface to communication network 140, and is coupled via communication network 140 to corresponding interface devices in some computer systems.

User interface input devices 822 may include a keyboard, pointing devices such as a mouse, trackball, touchpad, or graphics tablet, a scanner, a touch screen incorporated into the display, audio input devices such as voice recognition systems, microphones, and other types of input devices. In general, use of the term "input device" is intended to include all possible types of devices and ways to input information into computer system 810 or onto communication network 140.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some mechanism for creating a visible image. The display subsystem may also provide non-visual display such as via audio output devices. In general, use of the term "output device" is intended to include all possible types of devices and ways to output information from computer system 810 to the user or to another machine or computer system.

Storage subsystem 824 stores programming and data constructs that provide the functionality of some or all of the modules described herein, including the logic to create inferred queries for use as query suggestions according to the processes described herein. These software modules are generally executed by processor 814 alone or in combination with additional processors.

Memory 826 used in the storage subsystem can include a number of memories including a main random access memory (RAM) 830 for storage of instructions and data during program execution and a read only memory (ROM) 832 in which fixed instructions are stored. A file storage subsystem 828 can provide persistent storage for program and data files, and may include a hard disk drive, a floppy disk drive along with associated removable media, a CD-ROM drive, an optical drive, or removable media cartridges. The modules implementing the functionality of certain embodiments may be stored by file storage subsystem 828 in the storage subsystem 824, or in additional machines accessible by the processor.

Bus subsystem 812 provides a mechanism for letting the various components and subsystems of computer system 810 communicate with each other as intended. Although bus subsystem 812 is shown schematically as a single bus, some embodiments of the bus subsystem may use multiple busses.

Computer system 810 can be of varying types including a workstation, server, computing cluster, blade server, server farm, or any other data processing system or computing device. Due to the ever-changing nature of computers and networks, the description of computer system 810 depicted in FIG. 8 is intended only as a specific example for purposes of illustrating the preferred embodiments. Many configurations of computer system 810 are possible having more or fewer components than the computer system depicted in FIG. 8.

It is understood that these examples are intended in an illustrative rather than in a limiting sense. Computer-assisted processing is implicated in the described embodiments. Accordingly, the present disclosure may be embodied in methods for creating inferred queries for use as query suggestions, systems including logic and resources to create inferred queries for use as query suggestions, systems that take advantage of computer-assisted methods for creating inferred queries for use as query suggestions, media impressed with logic to create inferred queries for use as query suggestions, data streams impressed with logic to create inferred queries for use as query suggestions, or computer-accessible services that carry out computer-assisted methods for creating inferred queries for use as query suggestions. It is contemplated that modifications and combinations will readily occur, which modifications and combinations will be within the scope of the following claims.

What is claimed is:

1. A computer implemented method, comprising:
    identifying, as a training example for a query suggestion rule, a pair comprising a document visited and a subsequent query, the subsequent query submitted after visiting the document visited;
    generating a feature representation for the pair, the feature representation including a first vector of document features representing content of the document visited, and a second vector of query features representing content of the subsequent query;
    training the query suggestion rule, wherein training the query suggestion rule includes jointly embedding document features of the first vector and query features of the second vector in a reduced dimensionality space to induce distances between the embedded document features and the embedded query features in the reduced dimensionality space, wherein the distances are indicative of a semantic relationship between content of the document visited and content of the subsequent query;
    receiving a document locator corresponding to an additional document;
    generating a third vector of additional document features of the additional document, the additional document features representing the content of the additional document;
    mapping the third vector to the reduced dimensionality space;
    locating one or more embedded query features based on their respective distances from the mapped third vector; and
    identifying one or more suggested queries based on the located embedded query features.

2. The method of claim 1, wherein the training of the query suggestion rule includes iteratively embedding the first and second vectors in the reduced dimensionality space.

3. The method of claim 1, wherein the training of the query suggestion rule is based on the embedding.

4. The method of claim 1, wherein the query suggestion rule is trained as follows:

$$S(w_i, q_i^+) > S(w_i, q_i^-) + c, \text{ for every } (w_i, q_i^+), (w_i, q_i^-) \text{ in } P,$$

wherein $S(w_i, q_i^+)$ is a similarity score for a more relevant pair, $S(w_i, q_i^-)$ is a similarity score for a less relevant pair in a group of pairs P, and c is a non-zero constant.

5. The method of claim 1, wherein identifying the pair comprises selectively identifying the pair based on a determination that a passage of time between visitation of the document and the submission of the subsequent query satisfies a threshold.

6. The method of claim 1, wherein identifying the pair comprises selectively identifying the pair based on occurrence or non-occurrence of one or more intervening document visits or queries.

7. The method of claim 1, wherein the content of the document visited includes words.

8. The method of claim 7, further comprising using different vocabularies for the content of the document visited and for the content of the subsequent query.

9. The method of claim 8, further comprising selecting limited vocabularies for the document features and the content features based at least in part on discriminating power of selected vocabularies.

10. The method of claim 9, wherein the selected vocabularies include n-gram sequences of words, characters or terms.

11. The method of claim 1, further comprising applying the query suggestion rule to content of a first group of documents to score a first group of potential queries related to the documents in the first group of documents.

12. The method of claim 11, further comprising using at least the scores of the first group of potential queries to select query suggestions for the documents in the first group of documents and saving the query suggestions for future suggestion to users.

13. The method of claim 1, wherein the reduced dimensionality space represents co-occurrence of the document features and the query features by embedding the first and second vectors into a multi-dimensional space with fewer dimensions than used by the first and second vectors.

14. A computer implemented method, comprising:
    generating, as training examples for a query suggestion rule, feature representations, each of the feature representations including a first vector of document features representing content of a visited document, and a second vector of query features representing content of a subsequent query, the subsequent query submitted after visiting the visited document;

training the query suggestion rule, wherein training the query suggestion rule includes jointly embedding the document features and query features of the first and second vectors of each feature representation in a reduced dimensionality space to induce distances between the embedded document features and the embedded query features in the reduced dimensionality space, wherein the distances are indicative of a semantic relationship between content of the documents visited and content of the subsequent queries;

receiving a document locator corresponding to an additional document;

generating an additional vector of additional document features of the additional document, the additional document features representing the content of the additional document;

mapping the additional vector in the reduced dimensionality space by applying the query suggestion rule;

locating one or more embedded query features based on their respective distances from the mapped additionally vector; and identifying one or more suggested queries based on the located embedded query features.

15. The method of claim 14, further comprising applying the query suggestion rule to content of a first group of documents to score a first group of potential queries related to the documents in the first group of documents, wherein at least some documents in the first group of documents are not represented in the feature representations.

16. A system comprising:
one or more processors configured to perform operations comprising:
identifying, as a training example for a query suggestion rule, a pair comprising a document visited and a subsequent query, the subsequent query submitted after visiting the document visited;

generating a feature representation for the pair, the feature representation including at least a first vector of document features representing content of the document visited, and at least a second vector of query features representing content of the subsequent query;

training the query suggestion rule, wherein training the query suggestion rule includes jointly embedding document features of the first vector and query features of the second vector in a reduced dimensionality space to induce distances between the embedded document features and the embedded query features in the reduced dimensionality space, wherein the distances are indicative of a semantic relationship between content of the document visited and content of the subsequent query;

receiving a document locator corresponding to an additional document;

generating a third vector of additional document features of the additional document, the additional document features representing the content of the additional document;

mapping the third vector to the reduced dimensionality space;

locating one or more embedded query features based on their respective distances from the mapped third vector; and identifying one or more suggested queries based on the located embedded query features.

17. The system of claim 16, wherein the training of the query suggestion rule includes iteratively embedding the first and second vectors in the reduced dimensionality space.

* * * * *